United States Patent [19]

Harper, III

[11] Patent Number: 4,863,638

[45] Date of Patent: Sep. 5, 1989

[54] PROCESS FOR HAZARDOUS WASTE CONTAINMENT

[76] Inventor: Raymond F. Harper, III, 137-B Garden Ave., Browns Mills, N.J. 08015

[21] Appl. No.: 177,294

[22] Filed: Apr. 1, 1988

[51] Int. Cl.[4] .......................... G21F 9/12; G21F 9/24; B65G 5/00

[52] U.S. Cl. ................................ 252/633; 250/506.1; 250/507.1; 252/626; 376/272; 405/53; 405/54; 405/128

[58] Field of Search .......................... 250/506.1, 507.1; 405/128, 129, 53, 54; 252/633; 376/261, 272; 210/747, 901, 170

[56] References Cited

U.S. PATENT DOCUMENTS

| | | | |
|---|---|---|---|
| 3,586,624 | 6/1971 | Larson | 405/129 |
| 3,935,467 | 1/1976 | Gablin | 250/507.1 |
| 4,021,676 | 5/1977 | Duffy | 250/506.1 |
| 4,039,842 | 8/1977 | Mollon | 250/518.1 |
| 4,100,860 | 7/1978 | Gablin et al. | 109/83 |
| 4,194,855 | 3/1980 | Egger | 405/128 |
| 4,222,889 | 9/1980 | Uerpmann | 53/474 |
| 4,350,461 | 9/1982 | Valiga et al. | 405/128 |
| 4,362,434 | 12/1982 | Valiga et al. | 405/128 |
| 4,375,930 | 3/1983 | Valiga | 405/128 |
| 4,409,029 | 10/1983 | Larker et al. | 419/10 |
| 4,415,459 | 11/1983 | Coffman et al. | 210/747 |
| 4,428,700 | 1/1984 | Lennemann | 405/128 |
| 4,430,256 | 2/1984 | Rustum | 252/628 |
| 4,678,375 | 7/1987 | Gagle et al. | 405/270 |
| 4,681,706 | 7/1987 | Mallory et al. | 252/633 |
| 4,696,599 | 9/1987 | Rakoczynski et al. | 405/129 |
| 4,701,280 | 10/1987 | Canevall | 252/633 |
| 4,778,628 | 10/1988 | Saha et al. | 252/633 |

FOREIGN PATENT DOCUMENTS 0235353 9/1987 European Pat. Off. ............ 405/129

OTHER PUBLICATIONS

Schevon et al. 1985 Municipal landfills using double liners: Seven Case Studies, Waste Age, Oct. Issue; pp. 61-64, 69-70.

*Primary Examiner*—Howard J. Locker
*Attorney, Agent, or Firm*—Sperry, Zoda & Kane

[57] ABSTRACT

A process for containment of hazardous waste is disclosed including initially encasing the waste material into a plurality of containment vessels each of which includes a coding on the exterior thereof to indicate the type of hazardous waste therein retained. The containment vessels are then secured with respect to one another into a grouping of 2 to 8 such vessels. The grouping is then entombed within a plastic casing to further prevent leaking of hazardous waste material outwardly from the vessels. Finally a handling device is attached with respect to the plastic casing to facilitate movement thereof. The individual containment vessels preferably are metal cylindrical drums and can be lead lined to facilitate retaining of low level radioactive waste therein. Preferably the grouping of containment vessels are banded together with steel banding. A support means may be included secured to the lower surface of the plastic casing such as a plurality of cylindrically shaped support legs to facilitate stability of the plastic casing after placement thereof. Preferably the casing support and the handling device is biodegradable and the plastic casing is seamless.

15 Claims, 2 Drawing Sheets

PROCESS FOR HAZARDOUS WASTE CONTAINMENT

BACKGROUND OF THE INVENTION

1. Field Of The Invention

The present invention provides a process for the disposal of hazardous wastes such as low level radiation solids, agent orange solids, asbestos waste and other similar wastes. In the process of the present invention it will be possible to make the environment safer for all mankind and to do away entirely with toxic chemical waste dumps such as to minimize pollution of the environment and minimize the bad effects from such pollution on human and animal health as well as the environment itself.

2. Description Of The Prior Art

A number of devices have been contemplated for containment of hazardous waste such as U.S. Pat. No. 4,409,029 patented Oct. 11, 1983 to H. Larker et al. on a Container For Enclosing Radioactive Waste And A Method For Treating Waste Enclosed In The Container; and U.S. Pat. No. 3,935,467 issued Jan. 27, 1976 to K. Gablin on Repository For Fissile Materials; U.S. Pat. No. 4,021,676 patented May 3, 1977 to J. Duffy on a Waste Canister For Storage Of Nuclear Wastes; U.S. Pat. No. 4,039,842 patented Aug. 2, 1977 to L. Mollon on a Fuel Storage Rack; K. Gablin et al. U.S. Pat. No. 4,100,860 patented July 18, 1978 to on Safe Transportation Of Hazardous Materials; U.S. Pat. No. 4,222,889 patented Sept. 16, 1980 to E. Uerpmann on a Method For Encasing Waste Barrels In A Leachproof Closed Sheath; U.S. Pat. No. 4,375,930 patented March 8, 1983 to R. Valiga on a Permanent Disposal Vault For Containers; et al. U.S. Pat. No. 4,415,459 patented Nov. 15, 1983 to M. Coffman on Waste Disposal Systems And Methods; U.S. Pat. No. 4,428,700 patented Jan. 31, 1984 to W. Lennemann on Method For Disposing Of Waste Materials; and U.S. Pat. No. 4,430,256 patented Feb. 7, 1984 to R. Rustum on Reverse Thermodynamic Chemical Barrier For Nuclear Waste Over-Pack Or Backfill.

SUMMARY OF THE INVENTION

The present invention provides a process for containment of hazardous waste which includes encasing of the hazardous waste material into a plurality of containment vessels. These containment vessels preferably will be in the form of leak proof metal cylindrical drums. The exterior of the containment vessels is encoded such as by color coding or the like to externally indicate what type of hazardous waste is specifically retained within each individual containment vessel.

The containment vessels are then secured with respect to one another into this grouping in a fixed manner preferably by a steel banding means or the like. The so organized grouping of containment vessels is then inspected for leakage, correct color coding and secure banding.

The secured grouping of containment vessels is then entombed within a seamless clear plastic casing by a steam heated molding process. In this manner the containment vessels will be entombed within this clear plastic casing to further facilitate the prevention of any leaking of hazardous waste material outwardly from within the specific containment vessels. Preferably this plastic casing will be seamless and clear to thereby facilitate viewing of the coding applied externally thereto. Preferably the entombing will be performed in such a manner as to provide an eight inch clearance between the grouping of containment vessels and the top and side walls of the clear plastic casing extending therearound.

A pallet means may be secured with respect to the lower surface of the casing to facilitate handling of the entombed grouping of containment vessels. Furthermore a casing support means may be secured with respect to the lower surface of the plastic casing to facilitate stability thereof when placed. The casing support means preferably comprises a plurality of cylindrically shaped support legs being higher and of approximately eight inches in diameter. The casing support means as well as the pallet means preferably is biodegradable whenever underwater placement will be utilized.

It is an object of the present invention to provide a process for hazardous waste containment wherein landfill waste can also be securely stored.

is an object of the present invention to provide a process for hazardous waste containment wherein low level radiation waste can also be securely stored.

It is an object of the present invention to provide a process for hazardous waste containment wherein toxic chemical waste can be securely stored.

It is an object of the present invention to provide a process for hazardous waste containment wherein asbestos waste or contaminated radon soil can be securely stored.

It is an object of the present invention to provide a process for hazardous waste containment wherein contaminated radon soil can be securely stored.

It is an object of the present invention to provide a process for hazardous waste containment wherein storage of hazardous waste materials within oceans is possible without fear of leaking or leaching outwardly.

It is an object of the present invention to provide a process for hazardous waste containment wherein storage at sea is facilitated to generate new reef and improve marine life.

It is an object of the present invention to provide a process for hazardous waste containment wherein containment casings placed below water level can be useful to provide supports for sea walls, for minimizing beach erosion, and supporting platforms for objects placed in water.

It is an object of the present invention to provide a process for hazardous waste containment wherein the intake level of toxic wastes into the human body would be greatly decreased.

It is an object of the present invention to provide a process for hazardous waste containment wherein dump sites would be eliminated.

It is an object of the present invention to provide a process for hazardous waste containment wherein a finished entombed casing is provided which does not rust, decay or break down from age.

It is an object of the present invention to provide a process for hazardous waste containment wherein no leaking from the seams are possible since there are no seams.

It is an object of the present invention to provide a process for hazardous waste containment wherein excessive tax money outlays for maintaining landfills could be eliminated.

It is an object of the present invention to provide a process for hazardous waste containment wherein pollution to both air and water from toxic waste dumps would be eliminated.

It is an object of the present invention to provide a process for hazardous waste containment wherein leaking or leaching of the hazardous materials outwardly through the insulation means would be prevented when buried under ground.

It is an object of the present invention to provide a process for hazardous waste containment wherein interference with crops or farming would be eliminated.

It is an object of the present invention to provide a process for hazardous waste containment wherein forced movement of wildlife due to toxic environmental conditions would be eliminated.

It is an object of the present invention to provide a process for hazardous waste containment wherein hazardous or obnoxious fumes or odors associated with hazardous waste disposal systems used heretofore would be eliminated.

It is an object of the present invention to provide a process for hazardous waste containment wherein storage of hazardous waste materials on the ocean floor would be greatly facilitated.

It is an object of the present invention to provide a process for hazardous waste containment wherein coding would provide for easy identification of the type of waste materials stored in a specific location.

It is an object of the present invention to provide a process for hazardous waste containment wherein a one-piece molded construction is utilized for waste entombment whereby incineration of waste would no longer be necessary since incineration pollutes the air and leaves toxic ash present.

It is an object of the present invention to provide a process for hazardous waste containment wherein movement of the entombed groupings of hazardous waste containment vessels is possible merely by standard forklift operations.

It is an object of the present invention to provide a process for hazardous waste containment wherein the strict Environmental Protection Agency regulations and guidelines could easily be followed.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
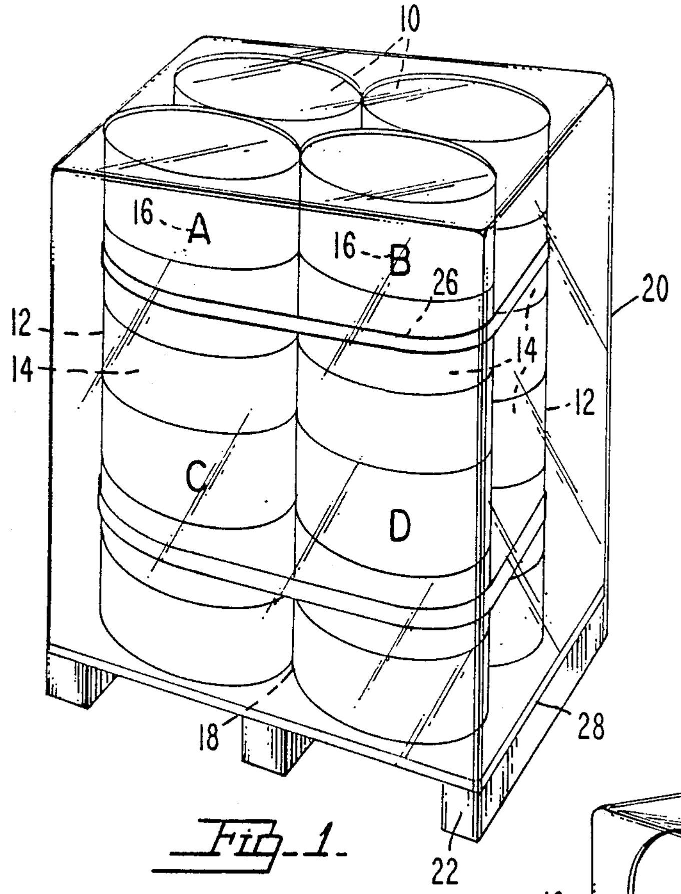
FIG. 1 is a perspective illustration of an embodiment of an encased and entombed plurality of containment vessels processed in accordance with the present invention.

The present invention provides a process for the containment of hazardous waste materials such as radiation solids, toxic soils and asbestos wastes or solids and other similar hazardous wastes. The hazardous waste material 10 is initially encased into a plurality of containment vessels 12 which preferably may be in the form of generally cylindrical drums or barrels 14. Drums 14 are preferably of a metal configuration to facilitate retainment of the hazardous waste therein. Lead lining 34 may be applied about the inside of the drum 14 or about the exterior of drum 14 to minimize radiation from low level radioactive wastes.

To facilitate knowledge as to the specific type of waste within a particular containment vessel a coding means 16 may be applied to the exterior of the individual containment vessels. Preferably this coding means can be a color coding means, or can be any other coding means such as alphabetic or numeric or symbolic characters.

The containment vessels 12 are organized into a grouping 18 thereof which may be anywhere from two to eight such vessels. This grouping 18 is then secured with respect to one another by a securement means such as a steel banding to facilitate retainment of the individual containment vessels with respect to one another. This steel banding means 26 extend in any direction as long as the individual containment vessels 12 are fixedly secured with respect to one another.

The banded grouping 18 of containment vessel 12 is then entombed within a plastic casing 20. This entombment is performed by a molding operation which preferably is steam heated but can be formed by any convenient means in order to provide preferably a seamless clear plastic casing completely entombing the grouping 18 of containment vessel 12.

To facilitate handling of the plastic casing 20 a handling means 22 may be secured to the plastic casing 20 or to the waste material itself. Handling means 22 can be secured to the lower surface 28. This handling means 22 may take the form of a pallet 24 or any other convenient type handling means.

Figure 2:
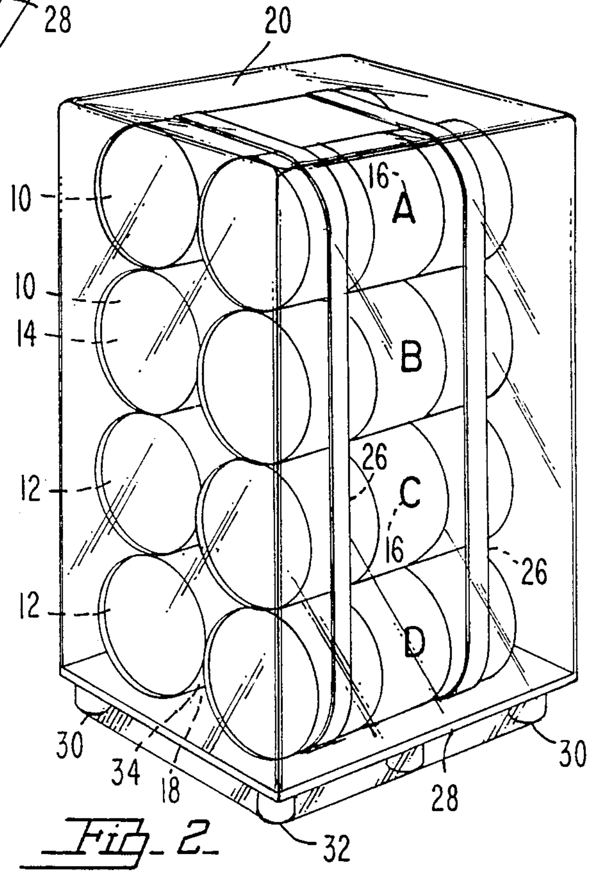
FIG. 2 is a perspective illustration of an alternative embodiment of the present invention showing the individual containment vessels in the vertically oriented position.
Figure 3:
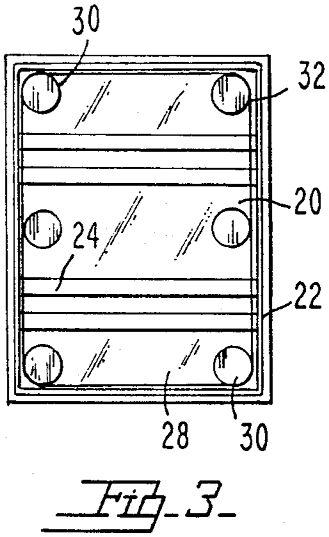
FIG. 3 is a bottom plan view of the embodiment shown in FIG. 1.

To facilitate stability of placement of the entombed grouping 18 of containment vessel 12 a plurality of casing support means 30 may be secured to the lower surface 28 of plastic casing 20. This support means may take the form of a plurality of cylindrical legs 32 which are preferably approximately eight inches in height and hollow thereby providing an extremely stable means of mounting upon any type of floor area and specifically with respect to the under ocean floor area. As shown best in FIG. 2 and in the bottom view shown in FIG. 3 the cylindrical legs 32 can provide overall stability by placement of one each adjacent each corner of the bottom surface 28 of transparent plastic casing 20. The finally entombed grouping of containment vessels 12 can be placed in any convenient location for storage without fear of any leakage or leaching of the hazardous waste 10 outwardly into the surrounding environment. This is made possible by the combination of the seamless transparent plastic casing 20 and the steel banded and possibly lead lined containment vessels 12 or drums 14. This combination of sealing means will prevent leakage or leaching of hazardous waste 10.

Figure 4:
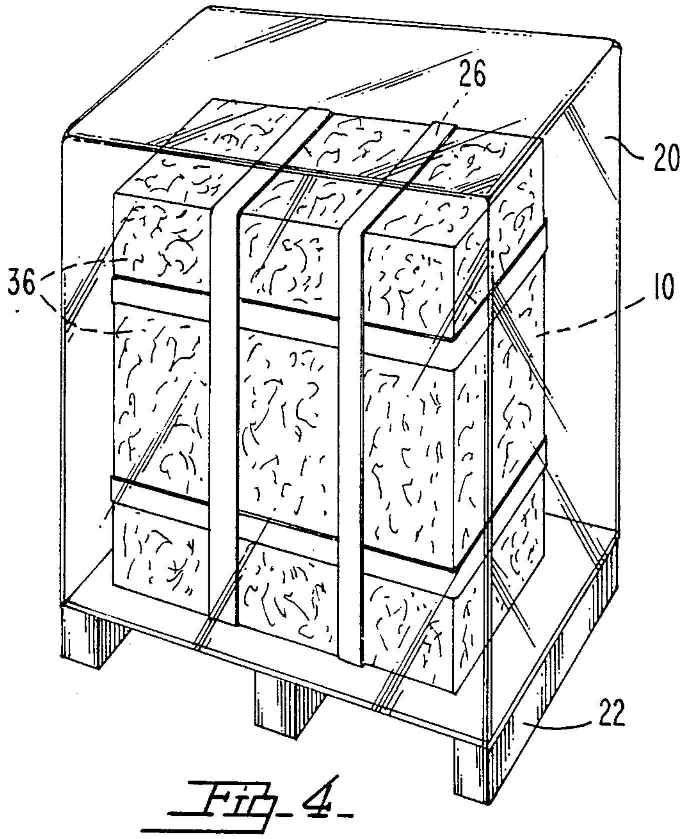
FIG. 4 is a perspective illustration of an embodiment of entombed and compressed hazardous landfill waste processed in accordance with an embodiment of the present invention.

The configuration shown in FIG. 4 is particularly usable for landfill waste wherein such waste can be compressed into modules 36 which can be cubical or of other shapes. A plurality of such compressed modules 36 can be banded together utilizing the banding means 26. These modules can then be entombed within a seamless transparent plastic coating in a similar manner to the process described above for encasing drums 14. The plastic transparent casing 20 will provide easy identification and seamless sealing of the hazardous landfill waste with respect to the surrounding environment.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A process for hazardous waste containment, particularly usable for ocean floor storage, comprising:
(a) encasing hazardous waste material into a plurality of cylindrical containment vessels;
(b) coding the exterior of each of the containment vessels to externally indicate which type of hazardous waste is retained with each containment vessel;
(c) securing the cylindrical containment vessels into a grouping fixedly with respect to one another by banding thereof; and
(d) entombing the secured grouping of containment vessels within a leakproof transparent seamless plastic casing to further prevent leaking of hazardous waste material outwardly from within the containment vessels and to facilitate viewing of the cylindrical containment vessels and the coding on the exterior thereof; and
(e) attaching a handling means of biodegradable material with respect to the plastic casing to facilitate handling of the entombed grouping of containment vessels.

2. A process for hazardous waste containment as defined in claim 1 wherein the containment vessels are made of metal.

3. A process for hazardous waste containment as defined in claim 1 wherein four individual containment vessels are utilized.

4. A process for hazardous waste containment as defined in claim 1 wherein six individual containment vessels are utilized.

5. A process for hazardous waste containment as defined in claim 1 wherein eight individual containment vessels are utilized.

6. A process for hazardous waste containment as defined in claim 1 wherein the handling means includes a pallet member at the lower surface of the plastic casing to facilitate handling and movement thereof.

7. A process for hazardous waste containment as defined in claim 1 further comprising securing a casing support means with respect to the lower surface of the plastic casing to facilitate stability thereof with respect to the surrounding environment.

8. A process for hazardous waste containment as defined in claim 1 wherein the casing support means includes a plurality of cylindrically shaped support legs.

9. A process for hazardous waste containment as defined in claim 8 wherein the cylindrically shaped support legs are hollow and approximately eight inches in length.

10. A process for hazardous waste containment as defined in claim 1 wherein said entombing of the secured grouping of containment vessels with a plastic casing is performed by a steam heated molding operation.

11. A process for hazardous waste containment as defined in claim 1 wherein the containment vessels are lined with lead to prevent radiation leakage from any encased hazardous waste which emits low level radiation.

12. A process for hazardous waste containment as defined in claim 1 wherein said entombing includes maintaining an eight inch clearance between the grouping of containment vessels within the plastic casing and the top and side walls thereof.

13. A process for hazardous waste containment as defined in claim 1 further comprising inspecting of the containment vessels for leakage, correct coding and secure banding immediately prior to entombing thereof.

14. A process for hazardous waste containment, particularly usable for ocean floor storage, as defined in claim 1 further comprising encasing the hazardous waste materials into a plurality of cylindrical containment vessels with the cylindrical axes thereof oriented in a horizontally extending direction.

15. A process for hazardous waste containment comprising:
(a) encasing hazardous waste material into a plurality of containment vessels, the containment vessels being leak proof metal cylindrical drums;
(b) color coding the exterior of each of the containment vessels to externally indicate which type of hazardous waste is retained within each containment vessel;
(c) securing the containment vessels with steel banding into a grouping fixedly with respect to one another;
(d) inspecting of the containment vessels for leakage, correct color coding and secure banding;
(e) entombing the secured grouping of containment vessels within a seamless clear plastic casing by steam heated molding thereof about the containment vessels to further facilitate prevention of leaking of hazardous waste material outwardly from within the containment vessels and to facilitate viewing of said color coding applied externally thereto, said entombing including maintaining at least an eight inch clearance between the grouping of containment vessels and the top and side walls of the clear plastic casing extending therearound;
(f) attaching a pallet means with respect to the lower surface of the plastic casing to facilitate handling of the entombed grouping of containment vessels; and
(g) securing a casing support means with respect to the lower surface of the plastic casing to facilitate stability thereof with respect to the surrounding environment, the casing support means comprising a plurality of cylindrically-shaped support legs being hollow and of approximately eight inches in length, the casing support means being biodegradable.

* * * * *